（12） United States Patent
Matsuzaki et al.

(10) Patent No.: US 8,297,298 B2
(45) Date of Patent: Oct. 30, 2012

(54) VENT CONTROL VALVE FOR A FUEL TANK

(75) Inventors: Toru Matsuzaki, Sakura (JP);
Takatsugu Hirose, Sagamihara (JP);
Motoharu Takai, Fujisawa (JP); Itsuo Honda, Kamakura (JP)

(73) Assignees: Nifco, Inc., Yokohama-shi, Kanagawa (JP); Yachiyo Industry Co., Ltd., Sakura-shi, Tochigi (JP)

( * ) Notice: Subject to any disclaimer, the term of this patent is extended or adjusted under 35 U.S.C. 154(b) by 295 days.

(21) Appl. No.: 12/691,894

(22) Filed: Jan. 22, 2010

(65) Prior Publication Data

US 2010/0200079 A1    Aug. 12, 2010

(30) Foreign Application Priority Data

Jan. 23, 2009    (JP) .................................. 2009-012705

(51) Int. Cl.
*F16K 24/04*    (2006.01)
(52) U.S. Cl. ......................................... 137/202; 137/43
(58) Field of Classification Search .................... 137/43, 137/202
See application file for complete search history.

(56) References Cited

U.S. PATENT DOCUMENTS

| | | | | |
|---|---|---|---|---|
| 4,362,476 A | * | 12/1982 | Kemmner et al. | 137/587 |
| 5,797,434 A | * | 8/1998 | Benjey et al. | 137/202 |
| 6,557,595 B2 | | 5/2003 | Ozaki | |
| 6,592,100 B2 | * | 7/2003 | Chou et al. | 137/43 |
| 6,854,477 B2 | * | 2/2005 | Yamada et al. | 137/202 |
| 6,918,405 B2 | * | 7/2005 | Leonhardt | 137/202 |
| 6,941,966 B2 | | 9/2005 | Mori et al. | |
| 7,090,262 B2 | * | 8/2006 | Kurihara et al. | 137/202 |
| 7,188,613 B2 | * | 3/2007 | Miura et al. | 137/202 |
| 2005/0284539 A1 | * | 12/2005 | Leonhardt | 141/302 |
| 2011/0139301 A1 | * | 6/2011 | Hirose et al. | 141/199 |

FOREIGN PATENT DOCUMENTS

| JP | 2002002314 A | 1/2002 |
|---|---|---|
| JP | 2003166449 A | 6/2003 |

* cited by examiner

*Primary Examiner* — Craig Schneider
*Assistant Examiner* — Craig J Price
(74) *Attorney, Agent, or Firm* — Marshall & Melhorn, LLC (57) ABSTRACT

In a vent control valve for a fuel tank, a housing receiving a float assembly therein is provided with a communication hole passed across a wall of the housing, and an opening of the communication hole facing an interior of the housing is directly exposed to an interior of the housing when the float assembly is in a low position and overlaps with a peripheral wall of the float assembly when the float assembly is in a high position. By suitably selecting the size of the communication hole and/or the number thereof, a desired delay in the dropping of the liquid fuel level in the housing following the filling up of the fuel tank can be achieved. Thereby, overfilling of the fuel tank can be avoided.

8 Claims, 8 Drawing Sheets

VENT CONTROL VALVE FOR A FUEL TANK

TECHNICAL FIELD

The present invention relates to a vent control valve for a fuel tank, in particular to a vent control valve that allows fuel vapor in a fuel tank to be properly vented out of the fuel tank by an appropriate flow rate and still avoids the fuel tank to be overfilled even when the vertical dimension of the vent control valve is relatively small.

BACKGROUND OF THE INVENTION

Gasoline is one of most commonly used fuels for motor vehicles. Gasoline has a relative low vapor pressure under normal condition, and vaporizes to a significant extent in the fuel tank depending on the temperature and pressure of the gasoline within the fuel tank. The fuel vapor is required to be vented in order to control the internal pressure of the fuel tank within a prescribed level, and the vented gasoline vapor is recovered by a canister filled with charcoal or other absorbent substance in order to avoid polluting the atmosphere. The fuel vapor captured in the canister is conducted to the intake system of the engine to be burned in the engine.

The canister is connected to the fuel tank via a pipe, and the fuel tank end of the pipe is connected to an upper part of the fuel tank to avoid liquid fuel from being forwarded to the canister. However, the vehicle is often subjected to violent motions due to irregular road surfaces, and the accelerations/decelerations and cornering movements of the vehicle, and may be parked on a slanted road surface. Therefore, the fuel tank end of the pipe leading to the canister is provided with a cutoff valve which is provided with a float valve configured to close the communication to the canister when the liquid fuel level rises beyond a certain level.

The fuel tank is additionally provided with an arrangement for preventing the overfilling the fuel tank that includes a float valve. This float valve closes when the liquid fuel level reaches a certain level, and causes the internal pressure of the fuel tank to rise. This causes the liquid fuel to rise in the filler pipe, and this in turn causes the fill limit sensor of the fuel pump nozzle to be activated. This arrangement controls excessive filling of fuel in the fuel tank, and ensures an adequate gas phase space within the gas tank. It has been proposed to combine the float valve for controlling the communication with the canister and the float valve for preventing the overfilling of the fuel tank into a single integrated valve. See Japanese patent No 3931291 (patent document 1) and Japanese patent 3948194 (patent document 2), for instance.

In the float valve disclosed in patent document 1, a small opening is formed in a case (housing) receiving a float therein to communicate the interior of the fuel tank with a pipe leading to a canister. This small opening is provided at a height higher than the liquid fuel level when the fuel tank is filled up so that even when the lower opening of the housing is closed by the liquid fuel, the fuel vapor is allowed to be vented to the canister.

In addition to the small opening, the housing of the float valve is provided with a skirt extending vertically in a lower part thereof. Thereby, when the liquid fuel level exceeds the level of the lower opening of the skirt, an increase in the internal pressure of the fuel tank causes the fuel liquid level within the housing (or skirt) to rise higher than the liquid fuel level of the remaining part of the fuel tank, and this in turn causes the float to rise. Once the float has risen high enough to close the port communicating with the canister, the internal pressure of the fuel tank rises sharply, and this activates the fill limit switch of the fuel pump nozzle. Thereafter, the fuel vapor is gradually introduced into the housing via the small opening, and this causes the pressure in the housing to drop. This in turn causes the float to drop and the communication with the canister to be established again. If this occurs too soon, the liquid fuel level in the filler pipe may drop too quickly and the fill limit sensor of the fuel nozzle to be released depending on the way the fuel is filled so that overfilling of the fuel tank could occur.

The problem of overfilling can be avoided by reducing the opening area of the small opening in the housing as this would delay the dropping of the liquid fuel level in the housing (hence the opening of the port leading to the canister). However, to ensure fuel vapor to be forwarded to the canister at an adequate flow rate, the opening area of the small opening is required to be reasonably large. If the opening area of the small opening is too small, the pressure inside the housing can be readily reduced, and the resulting rise in the liquid fuel level in the housing causes the float valve to close with the result that the fuel vapor is prevented from being vented to the canister at an adequate flow rate.

Also, there is an increasing demand to reduce the height of the fuel tank for the purpose of efficiently utilizing the space available in a vehicle, and this in turn requires the height of the float valve to be minimized. This means a reduced height for the skirt, and this increases the sensitivity of the float valve to the change in the liquid fuel level in the housing. In other words, it becomes more difficult to ensure proper venting of fuel vapor and to prevent overfilling of the fuel tank at the same time.

BRIEF SUMMARY OF THE INVENTION

In view of such problems of the prior art, a primary object of the present invention is to provide a vent control valve for a fuel tank that has a relatively short skirt, but can adequately delay the fall of the liquid fuel level in the skirt after a filled up state of the fuel tank is detected.

A second object of the present invention is to provide a vent control valve for a fuel tank that can ensure fuel vapor to be properly vented out of the fuel tank but can prevent overfilling of the fuel tank in an effective manner.

According to the present invention, such an object can be at least partly accomplished by providing a vent control valve for a fuel tank, comprising: a cylindrical housing extending vertically, and configured to be attached to an upper wall of a fuel tank, the housing having an open lower end and a closed upper end defining a port communicating an interior of the housing with an external part of the fuel tank; a float assembly received in the housing and guided for a vertical movement therein, defining a prescribed gap between an outer profile of the float assembly and an inner circumferential wall of the housing; and a valve member provided in an upper part of the float assembly to close the port of the cylindrical housing when the float assembly has floated to a prescribed height; wherein the housing is provided with a communication hole passed across a wall of the housing, an opening of the communication hole facing an interior of the housing being directly exposed to an interior of the housing when the float assembly is in a low position and overlapping with a peripheral wall of the float assembly when the float assembly is in a high position.

By suitably selecting the size of the communication hole and/or the number thereof, a desired delay in the dropping of the liquid fuel level in the housing following the filling up of the fuel tank can be achieved. Thereby, overfilling of the fuel tank can be avoided. As the float assembly drops to such an extent as to clear the communication hole, the fuel vapor is allowed to flow more freely into the interior of the housing via the communication hole, and this causes an increase in the speed of the float to drop. Thereby, the venting of the fuel tank can be resumed at an appropriately earlier stage following the filled up state of the fuel tank. Thus, the closing and opening of the communication with the exterior of the fuel tank can be accomplished even when the vertical dimension of the housing is relatively small. A proper selection of a gap between an outer surface of the float and a wall surface at which the communication hole opens out contributes to the proper timing of the closing and opening the communication with the exterior of the fuel tank.

According to a preferred embodiment of the present invention, a plurality of vertically extending ribs are provided on an inner circumferential surface of the housing to guide the float assembly for a vertical movement. These ribs allow the vertical movement of the float assembly to be effected in a smooth manner. In particular, if at least one of the ribs is provided with a laterally enlarged portion, and the communication hole is passed across a thickness of the lateral enlarged portion, the inner surface of the housing at which the communication hole opens out can be brought close to the opposing surface of the float assembly so that a favorable control of the communication by the communication hole can be achieved.

The float assembly may comprise a lower float and an upper float connected to each other so as to permit a small displacement between them, and the valve member is provided on the upper end of the upper float. The float assembly may further comprise a middle float which is connected to the lower float so as to permit a small displacement between them, and the valve member comprise a rubber seal having a central hole passed vertically across the rubber seal, the rubber seal including an annular upper part configured to cooperate with a peripheral part of the port and a lower lip seal configured to close the central hole in cooperation with an upper surface of the middle float.

According to a particularly preferred embodiment of the present invention, an upper part of the lower float is formed with a reduced diameter portion and a radial flange formed at an upper end of the reduced diameter portion, and the upper float is provided with an upper horizontal wall and a peripheral wall depending from a peripheral part of the upper horizontal wall, a lower edge of the peripheral wall being provided with an engagement portion engaging the radial flange of the lower float.

The upper horizontal wall of the upper float may be provided with a central opening having the rubber seal fitted therein. The middle float may comprise an upper horizontal wall and a plurality of legs depending from the upper horizontal wall and received in openings formed in the radial flange of the lower float so as to guide a vertical movement of the middle float relative to the lower float.

For an optimum control of the buoyancy of the flow float, a compression spring may be interposed between the lower float and a shoulder piece extending radially inwardly from an inner circumferential surface of the housing.

If the cylindrical housing is provided with two or more communication holes at a regular angular interval, the effective cross sectional area of the communication holes can be kept substantially constant even when there is a gap between the inner circumference of the cylindrical housing and the outer circumference of the float assembly and the float assembly shifts laterally.

BRIEF DESCRIPTION OF THE DRAWINGS

Now the present invention is described in the following with reference to the appended drawings, in which.

DETAILED DESCRIPTION OF THE INVENTION

Figure 1:
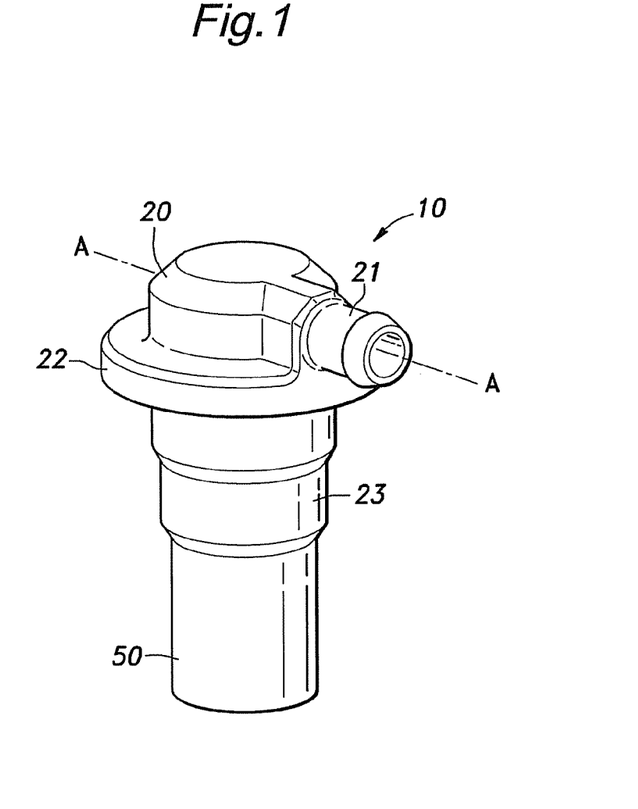
FIG. 1 is a perspective view of a vent control valve for a fuel tank embodying the present invention.
Figure 2:
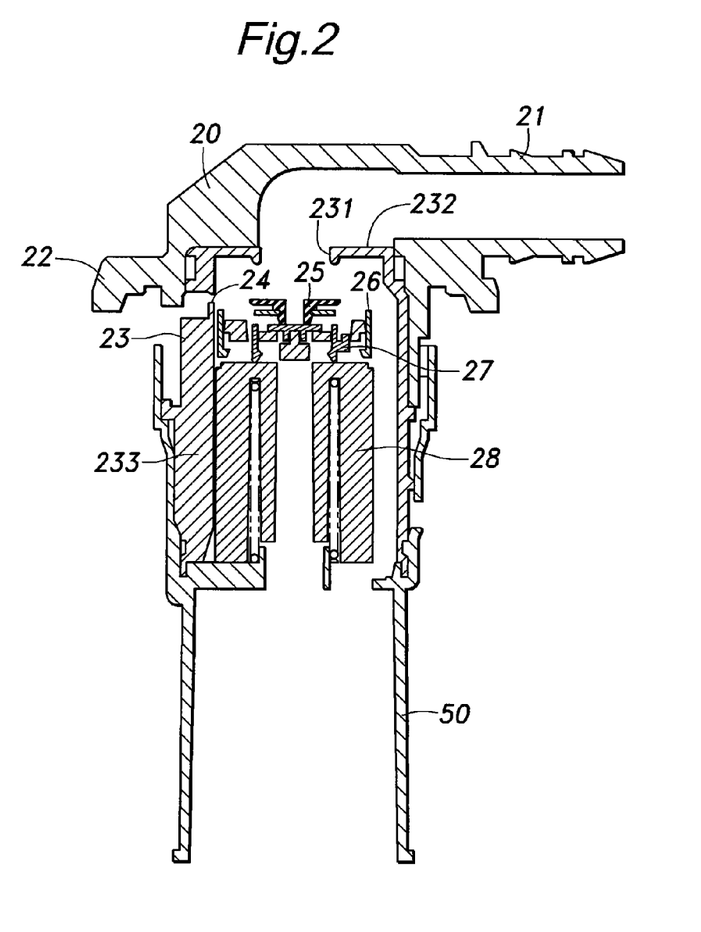
FIG. 2 is a vertical sectional view taken along line A-A of FIG. 1.
Figure 3:
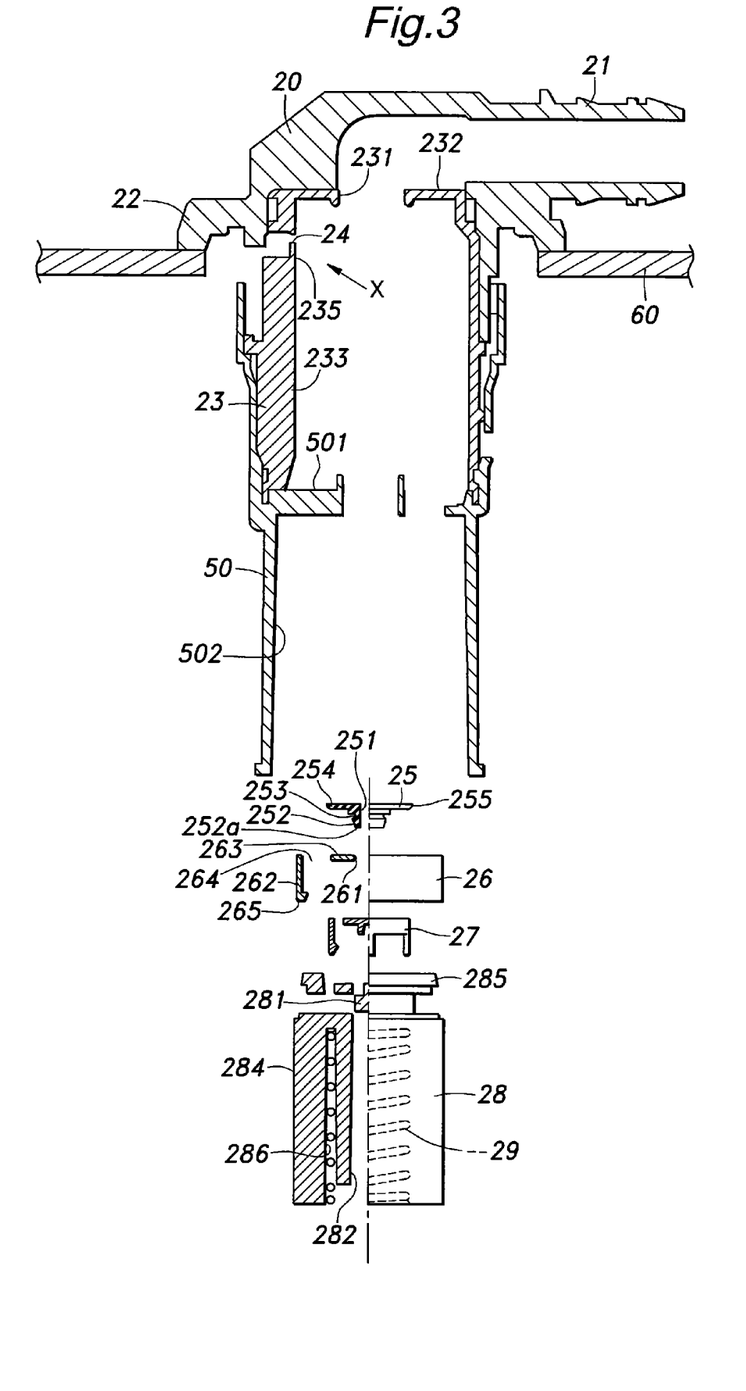
FIG. 3 is an exploded vertical sectional view of the vent control valve.

Referring to FIGS. 1 to 3, the vent control valve 10 is attached to an upper wall of a fuel tank 60, and comprises an upper body 20 and a lower body. The upper body 20 is provided with a vent passage 21 internally defined therein and communicating with a charcoal canister external to the fuel tank 60 via a pipe not shown in the drawings, and a flange 22 for connecting the upper body 20 to the a fuel tank 60. The lower body is generally cylindrical in shape, and comprises a valve case 23 fitted into a lower cavity of the upper body 20 and a skirt 50 fitted onto the lower end of the valve case 23 and forming a lower extension of the valve case 23. The skirt 50 has a lower edge 503 defining a horizontal plane. The lower body is referred to as a housing in the following description.

The vent passage 21 of the upper body 20 includes a horizontal section having an open outer end and an inner end communicating with the lower cavity of the upper body 20. The upper body 20 is integrally molded by plastic material. The flange 22 may be attached to the fuel tank 60 by welding, bonding or other means that ensures a gas tight and mechanically secure connection.

The valve case 23 is cylindrical in shape and has a horizontal upper wall 232 or has the shape of an inverted cup. The upper wall 232 of the valve case 23 is formed with a central opening 231 communicating the interior of the valve case 23 with the cavity of the upper body 20. The upper end of the valve case 23 is fitted into a lower opening of the upper body 20, and is welded, bonded or mechanically attached thereto, and the lower end of the valve case 23 is connected to the skirt 50 which opens out toward the interior of the fuel tank 60.

Figure 4:
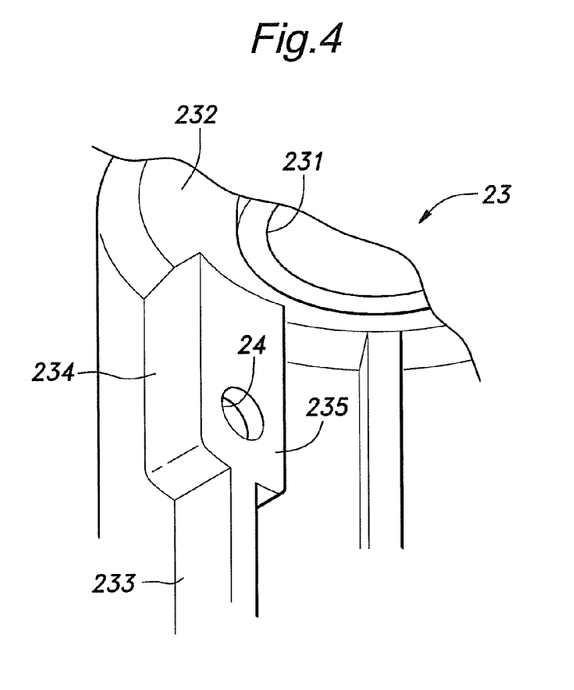
FIG. 4 is an enlarged fragmentary perspective view of a part of FIG. 3 indicated by arrow X in FIG. 3.

As best shown in FIG. 4, the inner circumferential wall of the valve case 23 is provided with a plurality of vertical ribs 233 extending substantially over the entire height of the valve case 23 and arranged at a regular interval along the circumference of the valve case 23. These ribs 233 provide a guide for a float assembly for a smooth vertical movement thereof as will be described hereinafter. The upper end of one of the ribs 233 is laterally enlarged, and this enlarged portion 234 is formed with a communication hole 24 communicating the interior of the valve case 23 with the exterior thereof or the interior of the fuel tank 60. The inner surface 235 of the enlarged portion 234 may be a part of a cylindrical surface concentric to the valve case 23, or may be planar. Only one communication hole 24 is provided in the illustrated embodiment, but two or more communication holes 24 may also be formed (along with so many enlarged portions 234).

The valve case 23 receives a float assembly therein, and the float assembly comprises, from top to bottom, an upper float 26 centrally fitted with a seal rubber 25 at an upper end thereof, a middle float 27 and a lower float 28 in that order.

As shown in FIGS. 2 and 3, the upper float 26 has the shape of an inverted cup including a substantially horizontal upper wall 263 and a peripheral wall 262 depending from the peripheral edge of the upper wall 263, and the upper wall 263 is formed with a central primary opening 261 and a plurality of secondary openings 264 arranged around the central primary opening 261. The lower end of the peripheral wall 262 of the upper float 26 is provided with a radially inwardly directed annular bead 265. The upper end of the lower float 28 is formed as a reduced diameter portion 281, and an upper end of the reduced diameter portion 281 is provided with a radial flange 285 which is received within the upper float 28, and is retained thereby the annular bead 265. Thus, the radial flange 285 may be forced into the upper float 26 but prevented from being pulled out of the upper float 26 during normal use. The peripheral wall 262 of the upper float 26 is given with an outer diameter so as to define a prescribed gap t to the opposing wall of the enlarged portion 234.

The seal rubber 25 has the shape of an inverted hat, and includes a central thick portion 252 formed with a vertically extending through hole 251 and a peripheral annular groove 253 on the peripheral side wall thereof, and an annular upper part in the form of an annular disk 255 extending horizontally from an upper part of the central thick portion 252. The central thick portion 252 is fitted into the central opening 261 of the upper float 26, and the surrounding edge of the upper wall of the upper float 26 is resiliently fitted into the peripheral annular groove 253 of the seal rubber 25. The upper surface of the peripheral annular disk 255 of the seal rubber 25 defines an annular seal surface 254 that cooperates with an annular bead formed around the communication hole 231 in the upper wall of the valve case 23.

The middle float 27 essentially consists of a disk member having a plurality of legs depending from the outer periphery thereof at a regular interval along the circumference thereof. Each of the legs fits into a corresponding opening formed in the upper flange of the lower float 28 for a vertical guided movement, and is provided with a claw that allows the leg to be forced into the opening but prevents the leg to be pulled out of the opening during normal use. The middle float 27 is provided with a plurality of openings extending across the thickness thereof. The upper surface of the middle float 27 is planar, and is configure to cooperate with a lip seal 252a formed in the lower end of the central thick portion 252 of the rubber seal 25. When the middle float 27 is pushed against the lip seal 252a, the through hole 251 is closed.

The lower float 28 comprises a cylindrical main body 284 having a central bore 282 extending substantially over the entire height thereof. The reduced diameter portion 281 provided with the flange 285 extends from the upper end of the lower float 28. An annular slot 286 is formed concentrically in the wall of the lower float 28, and extends from the lower end of the cylindrical main body 284 into a certain depth which is short of the upper end of the cylindrical main body 284. A compression coil spring 29 is received in the annular slot 286. A plurality of shoulder pieces 501 extend radially inward from the inner circumferential surface 502 of the skirt 50. The compression coil spring 29 is interposed between these shoulder pieces 501 and the upper end of the annular slot 286, and resiliently urges the lower float 28 upward. The spring force of this compression spring 29 assists the buoyant force of the lower float 28 such that the float valve can be closed only when the liquid fuel level has exceeded a prescribed level, and the spring force alone is not adequate to close the float valve.

The upper float 26 is connected to the lower float 28 so as to be moveable axially relative each other or toward and away from each other by a small stroke. The bead 265 formed in the lower end of the peripheral wall 262 of the upper float 26 allows the upper flange 285 of the lower float 28 to be forced into the interior of the upper float 26, but keeps the upper flange 285 of the lower float 28 to be retained within the upper float 26. The middle float 27 is interposed between the upper float 26 and lower float 28, and the legs thereof are loosely fitted into the openings of the upper flange 285 of the lower float 28 so that the middle float 27 is axially moveable by a certain stroke within the space defined between the upper float 26 and lower float 28.

The skirt 50 is cylindrical in shape, and has a lower edge on a common horizontal plane. The upper end of the skirt 50 is connected to the valve case 23 via a mechanical engagement in the illustrated embodiment, but welding or bonding may also be used for the same purpose.

The mode of operation of this vent control valve is described in the following with reference to FIGS. 5 to 8.

Figure 5:
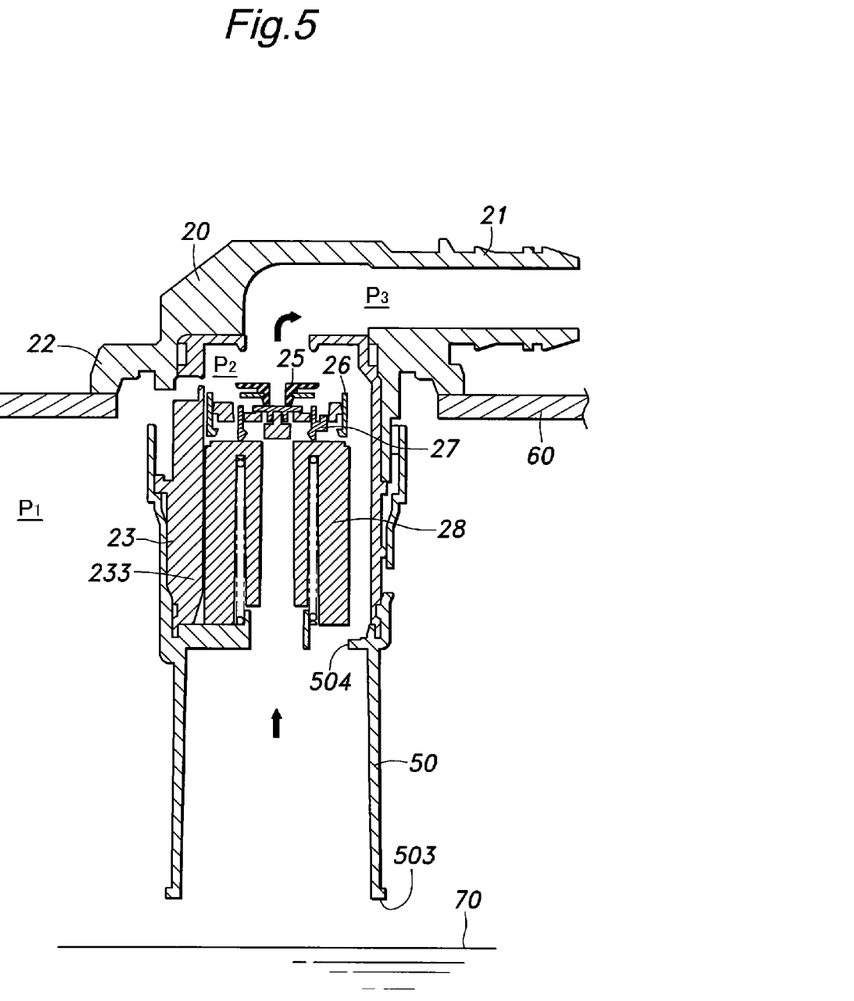
FIG. 5 is a view similar to FIG. 2 when the liquid fuel level is lower than the lower edge of a skirt of the vent control valve.

FIG. 5 shows the situation where the liquid fuel level 70 in the fuel tank 60 is lower than the lower edge 503 of the skirt 50. The fuel vapor that may be present in the fuel tank 60 is allowed to enter the interior of the housing (valve casing 23 and skirt 50) from the lower end of the skirt 50, and to pass into the vent passage 21 via the annular space defined between the lower float and opposing inner circumferential surface of the housing and the central opening 231 of the valve case 23. The ribs 233 center the lower float 25 in the valve case 23, and ensure the annular space to be defined between them. The communication hole 24 is also available for this flow of fuel vapor, but owing to a limited cross sectional area it provides, contributes very little in venting the fuel vapor in this situation. At this time, the pressure P1 in the fuel tank, pressure P2 in the valve case 23 and pressure P3 in the cavity of the upper body 20 are related such that $P1 > P2 > P3$.

Figure 6:
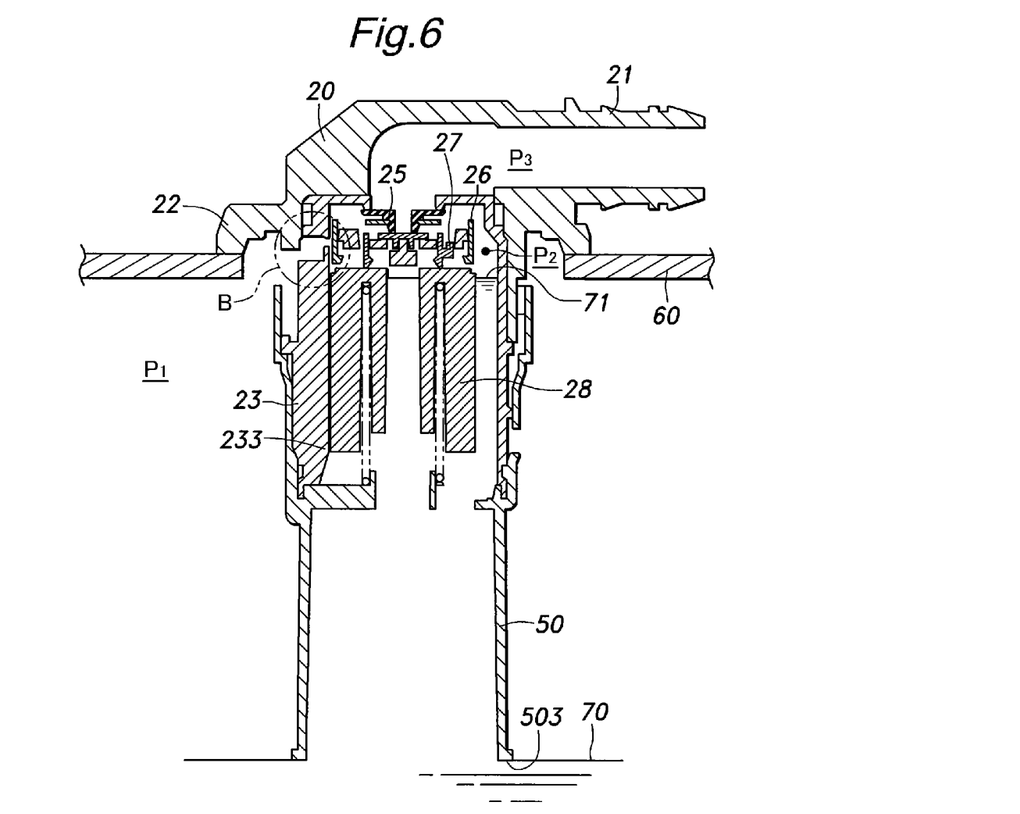
FIG. 6 is a view similar to FIG. 5 when the liquid fuel level in the skirt is high enough for a float valve to close a port communicating the interior of the fuel tank with a canister.
Figure 7:
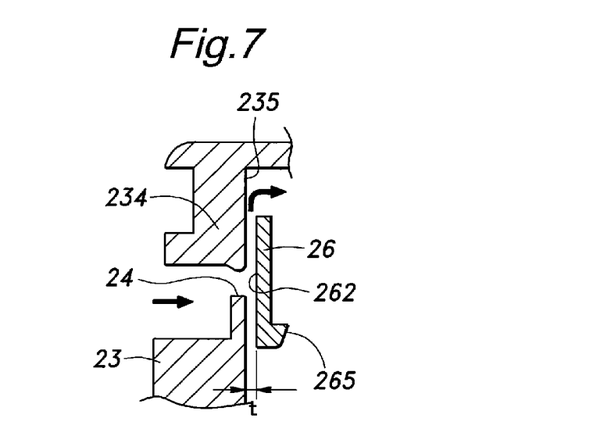
FIG. 7 is an enlarged fragmentary view of a part of FIG. 6 indicated by circle B.

FIG. 6 shows the situation where the liquid fuel level 70 in the fuel tank 60 has reached the lower edge 503 of the skirt 50, and the internal pressure of the fuel tank 60 has pushed the liquid fuel level in the housing to such a high level that the upper float 26 and middle float 27 are pushed upward by the lower float 28 and the rubber seal 25 is pushed against the valve seat of the central opening 231 of the valve case 23. At the same time, the middle float 27 is pushed against the lower lip of the rubber seal 25. As best shown in FIG. 7 showing the details of the area surrounding the communication hole 24, the outer circumferential surface of the peripheral wall 262 of the upper float 26 overlaps with the communication hole 24 formed in the valve case 23 at this time. As mentioned earlier, the prescribed gap t is formed between the enlarged portion 234 of the valve case 23 and opposing surface of the peripheral wall 262 of the upper float 26.

Figure 8:
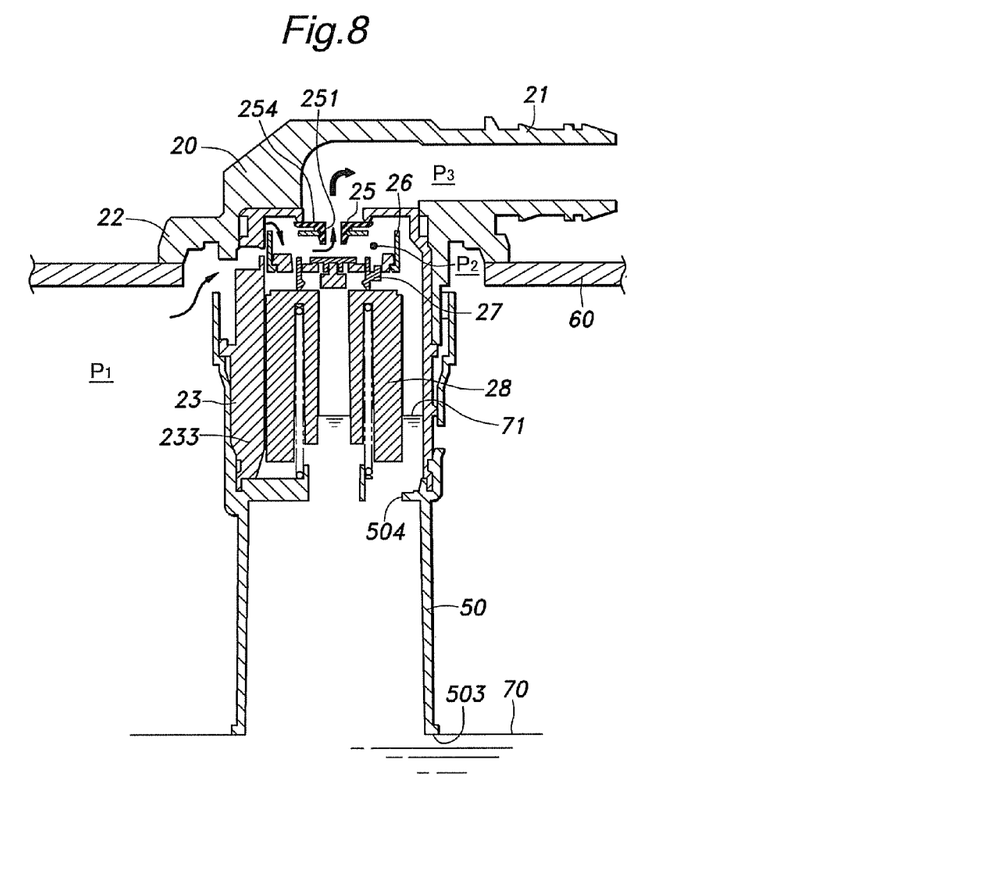
FIG. 8 is a view similar to FIG. 5 when the liquid fuel level in the skirt is dropping but the port communicating the interior of the fuel tank with a canister is still kept closed.

As shown in FIG. 8, the fuel vapor within the fuel tank 60 is allowed to enter the interior of the valve case 23 via the communication hole 24 and the gap t, but this path is significantly constricted as opposed to the case where the liquid fuel level is lower as illustrated in FIG. 5. However, the pressure P2 in the valve case 23 rises, and eventually becomes substantially equal to the pressure P1 in the fuel tank 60. This in turn causes the liquid fuel level 71 in the valve case 23 to drop toward the liquid fuel level of the fuel tank 60. Even after the lower float 28 has dropped by a certain distance, the upper float 26 remains in the same position, and the rubber seal 25 continues to close the central opening 231. The middle float 27 also remains in the same position, and continues to close the lower lip of the rubber seal 25.

However, as the liquid fuel level in the housing drops further, the middle float 27 drops and opens the lower lip of the rubber seal 25. This allows the interior of the housing to communicate with the canister (which is substantially at the atmospheric pressure), and the fuel vapor in the fuel tank 60 to be vented to the canister, however, at a limited flow rate, as illustrated in FIG. 8. In time, the lower float 28 drops even further, and ultimately pulls the rubber seal 25 away from the central opening 231 along with the upper float 26, this fully equalizes the internal pressure of the housing with the remaining part of the fuel tank 60. In short, the float assembly assumes the state illustrated in FIG. 5.

Thus, when the liquid fuel level in the fuel tank 60 has reached a tank full level, the communication with the canister is closed, and is reestablished with some time delay so that the overfilling of the fuel tank 60 can be avoided. A further drop of the lower float 28 causes the upper float 26 to drop clear of the communication hole 24. This causes a sudden increase in the opening area for the communication between the interior of the housing and interior of the fuel tank 60, and this regains the full capacity of the canister to absorb the fuel vapor. Therefore, the excessive rise in the internal pressure of the fuel tank can be avoided.

According to the illustrated embodiment, because the opening of the float valve following the filling of the fuel tank to a substantially full capacity takes place gradually and with a suitable time delay owing to the partial blockage of the communication hole, overfilling of the fuel tank can be avoided. And, owing to the subsequent prompt establishment of full communication between the fuel tank and canister achieved by the full exposure of the communication hole, proper venting of the fuel tank can be accomplished at the same time even when the vertical dimension of the housing or skirt is relatively small.

The communication hole 24 may also be formed in the housing at such a position that the lower float overlaps with the communication hole when the liquid fuel level in the housing has reached the high position.

Figure 9:
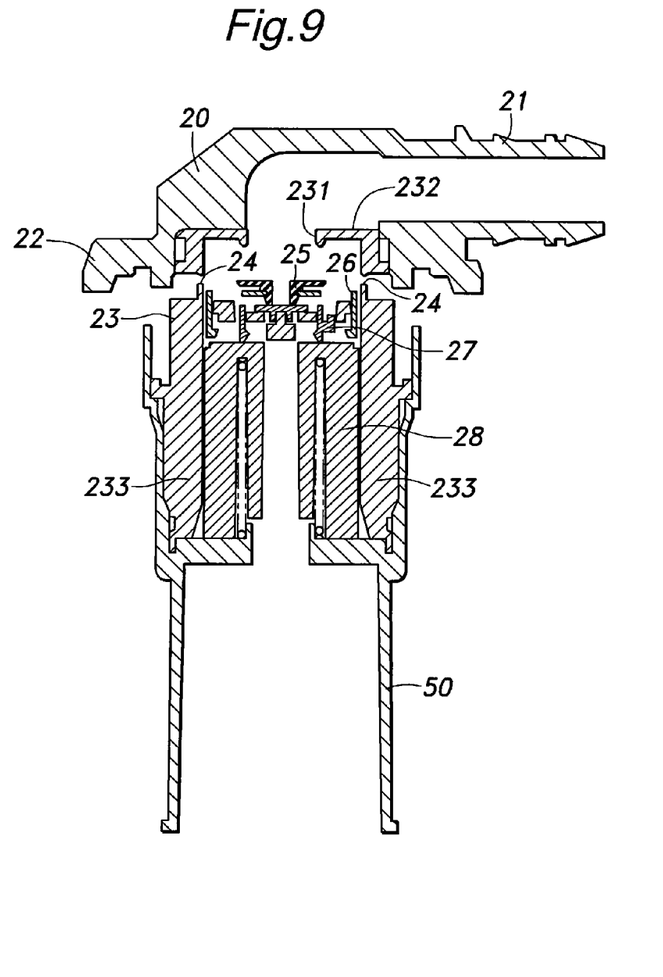
FIG. 9 is a view similar to FIG. 2 showing a second embodiment of the present invention.

FIG. 9 illustrates a second embodiment of the present invention. This embodiment differs from the previous embodiment in that the valve case 23 is provided with a pair of communication holes 24, instead of one, at diametrically opposite positions or at a regular angular interval of 180 degrees. According to this embodiment, the effective cross sectional area of the communication holes 24 can be kept substantially constant even when there is a gap between the inner circumference of the valve case 23 (in particular the ribs 233 thereof) and the outer circumference of the upper float 26 and the upper float 26 shifts laterally as seen in FIG. 9. If the upper float 26 moves or shifts toward one of the communication holes 24, the effective cross sectional area of the one communication hole 24 diminishes but that of the other communication hole 24 increases. It is also within the purview of the present invention that three or more communication holes 24 are provided in the valve case 23, preferably at a regular angular interval. For instance, when three communication holes 24 are formed in the valve case 23, they may be advantageously formed at an angular interval of 120 degrees, or, in other words, at diametrically opposing positions.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A vent control valve for a fuel tank, comprising:
a cylindrical housing extending vertically, and configured to be attached to an upper wall of the fuel tank, the housing having an open lower end and a closed upper end defining a port communicating an interior of the housing with an external part of the fuel tank;
a float assembly received in the housing and guided for a vertical movement therein, defining a prescribed gap between an outer profile of the float assembly and an inner circumferential wall of the housing; and
a valve member provided in an upper part of the float assembly to close the port of the cylindrical housing when the float assembly has floated to a prescribed height;
wherein the cylindrical housing is provided with a communication hole passed across a wall of the housing, an opening of the communication hole facing an interior of the housing being directly exposed to an interior of the housing when the float assembly is in a low position and overlapping with a peripheral wall of the float assembly when the float assembly is in a high position, wherein a plurality of vertically extending ribs are provided on an inner circumferential surface of the housing to guide the float assembly for a vertical movement, and wherein at least one of the ribs is provided with a laterally enlarged portion, the communication hole being passed across a thickness of the lateral enlarged portion.

2. The vent control valve according to claim 1, wherein the cylindrical housing is provided with two or more communication holes passed across a wall of the housing at a regular angular interval.

3. The vent control valve according to claim 1, wherein the float assembly comprises a lower float and an upper float connected to each other so as to permit a small displacement between them, and the valve member is provided on the upper end of the upper float.

4. The vent control valve according to claim 3, further comprising a compression spring interposed between the lower float and a shoulder piece extending radially inwardly from an inner circumferential surface of the housing.

5. The vent control valve according to claim 3, wherein the float assembly further comprises a middle float which is connected to the lower float so as to permit a small displacement between them, and the valve member comprise a rubber seal having a central hole passed vertically across the rubber seal, the rubber seal including an annular upper part configured to cooperate with a peripheral part of the port and a lower lip seal configured to close the central hole in cooperation with an upper surface of the middle float.

6. The vent control valve according to claim 5, wherein an upper part of the lower float is formed with a reduced diameter portion and a radial flange formed at an upper end of the reduced diameter portion, and the upper float is provided with an upper horizontal wall and a peripheral wall depending from a peripheral part of the upper horizontal wall, a lower edge of the peripheral wall being provided with an engagement portion engaging the radial flange of the lower float.

7. The vent control valve according to claim 6, wherein the upper horizontal wall of the upper float is provided with a central opening having the rubber seal fitted therein.

8. The vent control valve according to claim 7, wherein the middle float comprises an upper horizontal wall and a plurality of legs depending from the upper horizontal wall and received in openings formed in the radial flange of the lower float so as to guide a vertical movement of the middle float relative to the lower float.

* * * * *